United States Patent [19]
Schneider

[11] Patent Number: 5,690,375
[45] Date of Patent: Nov. 25, 1997

[54] EZEKIEL'S WHEEL

[76] Inventor: John Robert Schneider, 4 Woodside Dr. East, Apalachin, N.Y. 13732

[21] Appl. No.: 636,539

[22] Filed: Apr. 25, 1996

Related U.S. Application Data

[63] Continuation-in-part of Ser. No. 312,564, Sep. 26, 1994, Pat. No. 5,560,300.
[51] Int. Cl.⁶ .................................................. B60B 11/00
[52] U.S. Cl. ................................ 295/33; 301/5.1; 305/1
[58] Field of Search .............................. 295/3, 8.5, 32, 295/33, 34; 301/5.1, 5.23; 305/5, 1

[56] References Cited

U.S. PATENT DOCUMENTS 5,492,390  2/1996  Kugelmann ............................ 301/5.1

FOREIGN PATENT DOCUMENTS 1079468  3/1984  U.S.S.R. ............................... 301/5.1
1081004  3/1984  U.S.S.R. ............................... 305/5

*Primary Examiner*—Mark T. Le

[57] ABSTRACT

A railroad right of way is constructed of rails which have a top surface upon which the railroad car's wheels ride that undulates up and down. The plurality of wheels along the length of the rail car only bear the weight of the rail car when they happen to be the wheels that are momentarily positioned above the descending portions of the undulating track. A mechanical device attached separately to each wheel are employed to alternatively raise some of the wheels while simultaneously lowering others depending on each wheel's position over the undulations in the track at any one time. Undulations can change in frequency and height and position to those undulations in parallel rails forming the same right of way. Monorail right of ways are also practical using this undulating rail design concept. One type of mechanical devices of presenting a plurality of wheels to the undulating rails is a large wheel which displays a multiple number of independently operating, smaller wheels around its circumference which smaller wheels contact the surface separately in sequence as the large wheel turns.

3 Claims, 5 Drawing Sheets

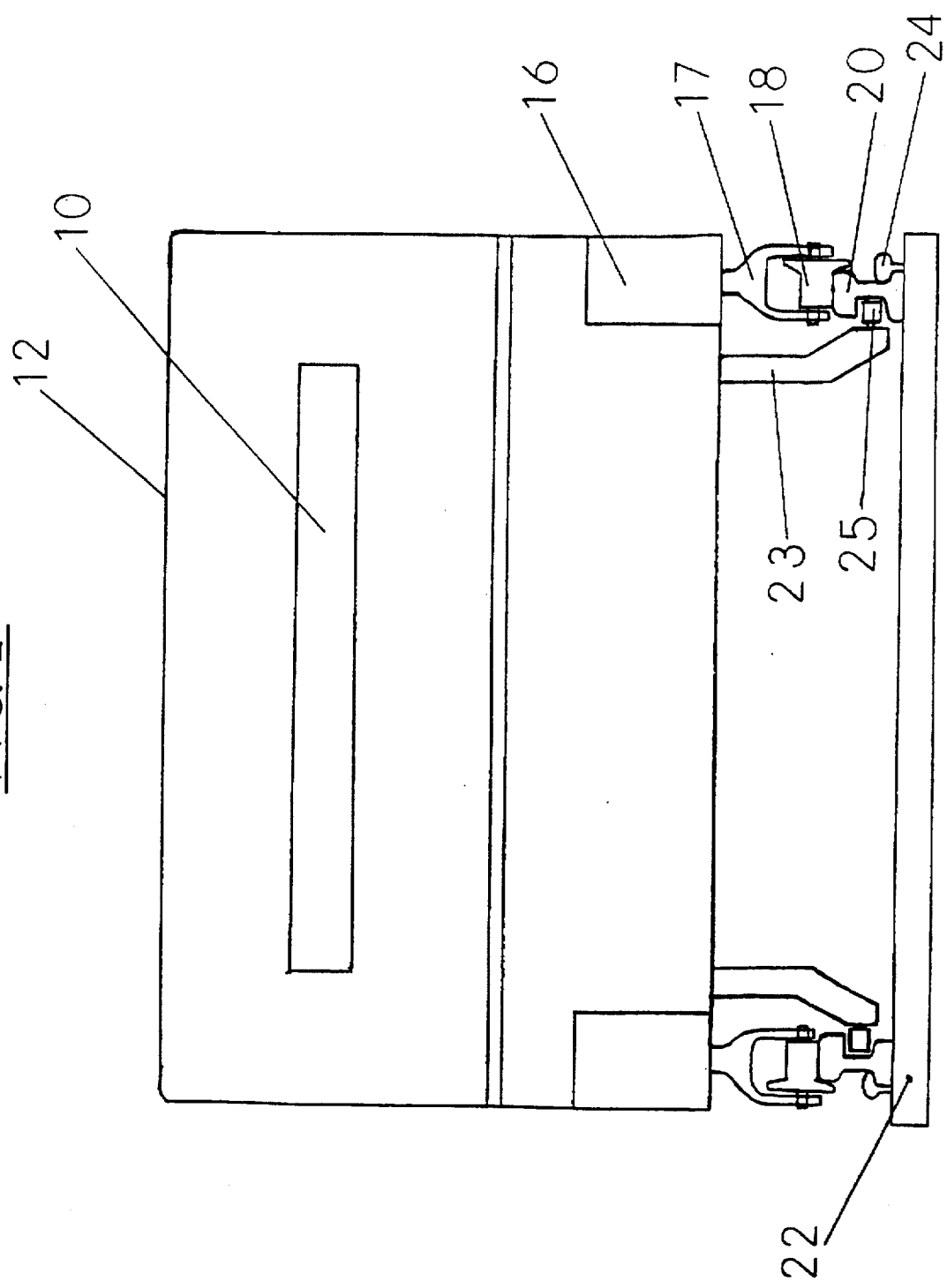

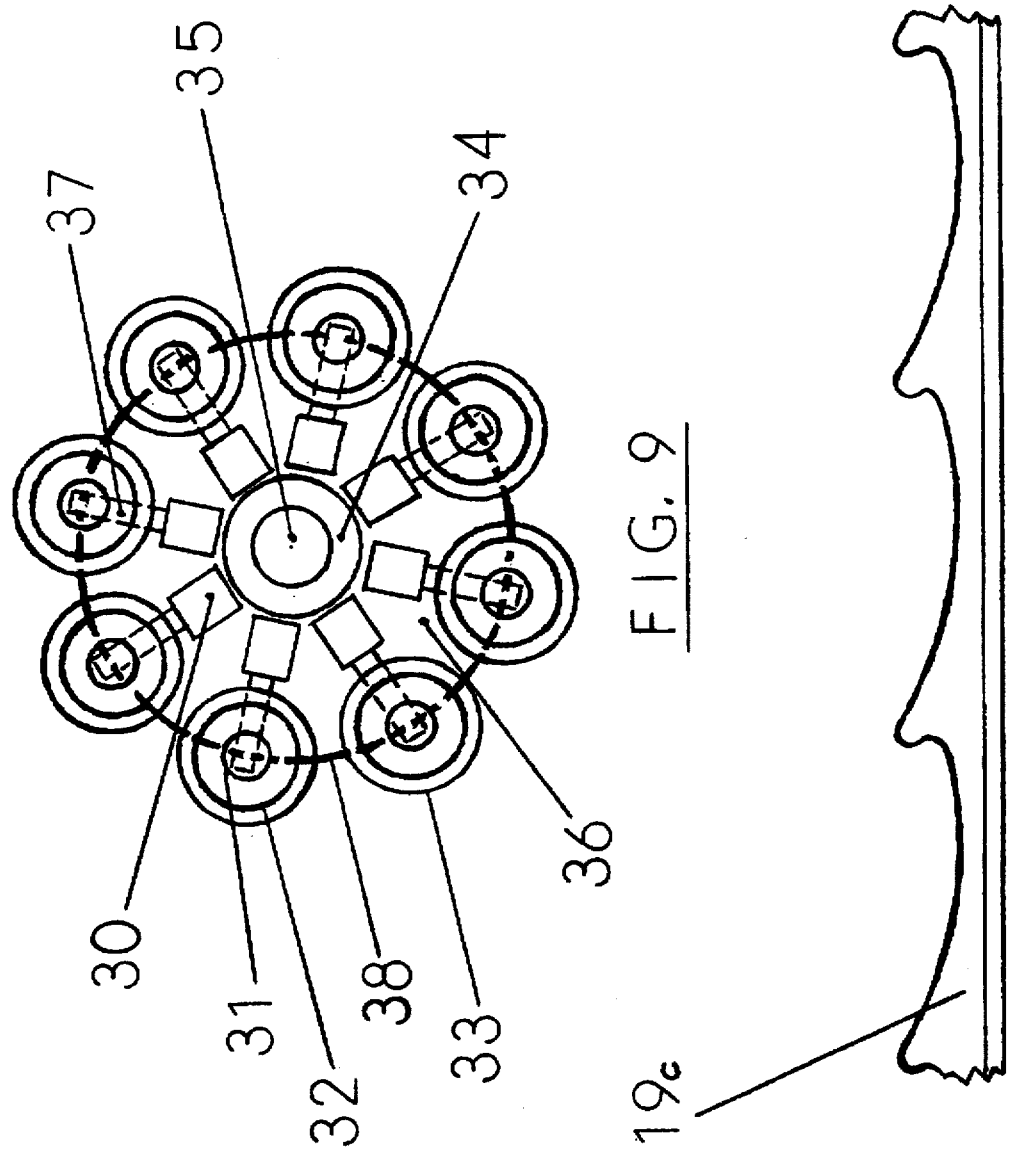

EZEKIEL'S WHEEL

This Application is a Continuation-In-Part of application Ser. No. 08/312,564, filed on Sep. 26, 1994, now U.S. Pat. No. 5,560,300.

FIELD OF THE INVENTION

The present invention pertains to high speed railroad car tracks.

BACKGROUND OF THE INVENTION

To date, the common means of rolling a railroad car down its track relies on smooth and flat rails with the railroad car wheels fixed on springs of air or steel springs which absorb at most a few inches of wheel reaction to track undulations. This has the effect of limiting the train's speed since cars exhibit little tolerance to uneven tracks and sway dangerously as speed continues to increase. The obvious need is for designs for mounting the wheels so they are more tolerant of uneven tracks and also to reduce the high torque now required on the wheels so that the train can be effectively driven forward without slippage and chattering of the wheels against the track. To do this the design this invention employs allows the wheels a much greater latitude in their shock absorbing movement and significantly reduces the torque required to move the train car at high speeds. This is accomplished by causing the car to always roll downhill. To accomplish this the tracks are formed to have a wave shape on the top of the track which gives approximately half the wheels the opportunity to be rolling down hill at any one time. The other half of the wheels are of course going up hill but they are not carrying any of the train car's weight as are the other half of the wheels which are rolling downhill.

SUMMARY OF THE INVENTION

It is an object of the present invention to produce a train car which rides on wheels that have the ability to travel up and down a foot or more in distance so that each wheel having its own computer controlled shock absorber keeps the wheel perfectly in contact with the rails and carrying just the right amount of load at the right extension.

It is another object of this invention to eliminate the need for present day driver wheels on railroad cars and to replace them with wheels that are only required to roll downhill unpowered thereby eliminating great amounts of vibration due to track and wheel misalignments that create wheel chatter and slippage.

It is a further object of this invention to provide railroad rails which have a wave form imparted to their top surface so that this undulating top surface gives the right of way made from these specially shaped rails a regular undulation of crests and troughs in a linear arrangement down the rails so that the wheels of the cars that are riding on these rails are constantly and regularly rolling first down hill and then up hill again through these waves formed on top of the rails.

It is still a further object of this invention to provide computer controls which insure that only the wheels which are rolling down hill are carrying the weight of the railroad car so the wheels rolling up hill are not loaded.

BRIEF DESCRIPTION OF THE DRAWINGS

FIG. 2 is a front view of the same car shown in FIG. 1;

FIG. 9 is a side view of a wheel with peripheral wheels designed to run on the undulating rails of this invention;

FIG. 10 is a side view of a curvilinear undulating rail.

DESCRIPTION OF THE PREFERRED EMBODIMENTS

Figure 1:
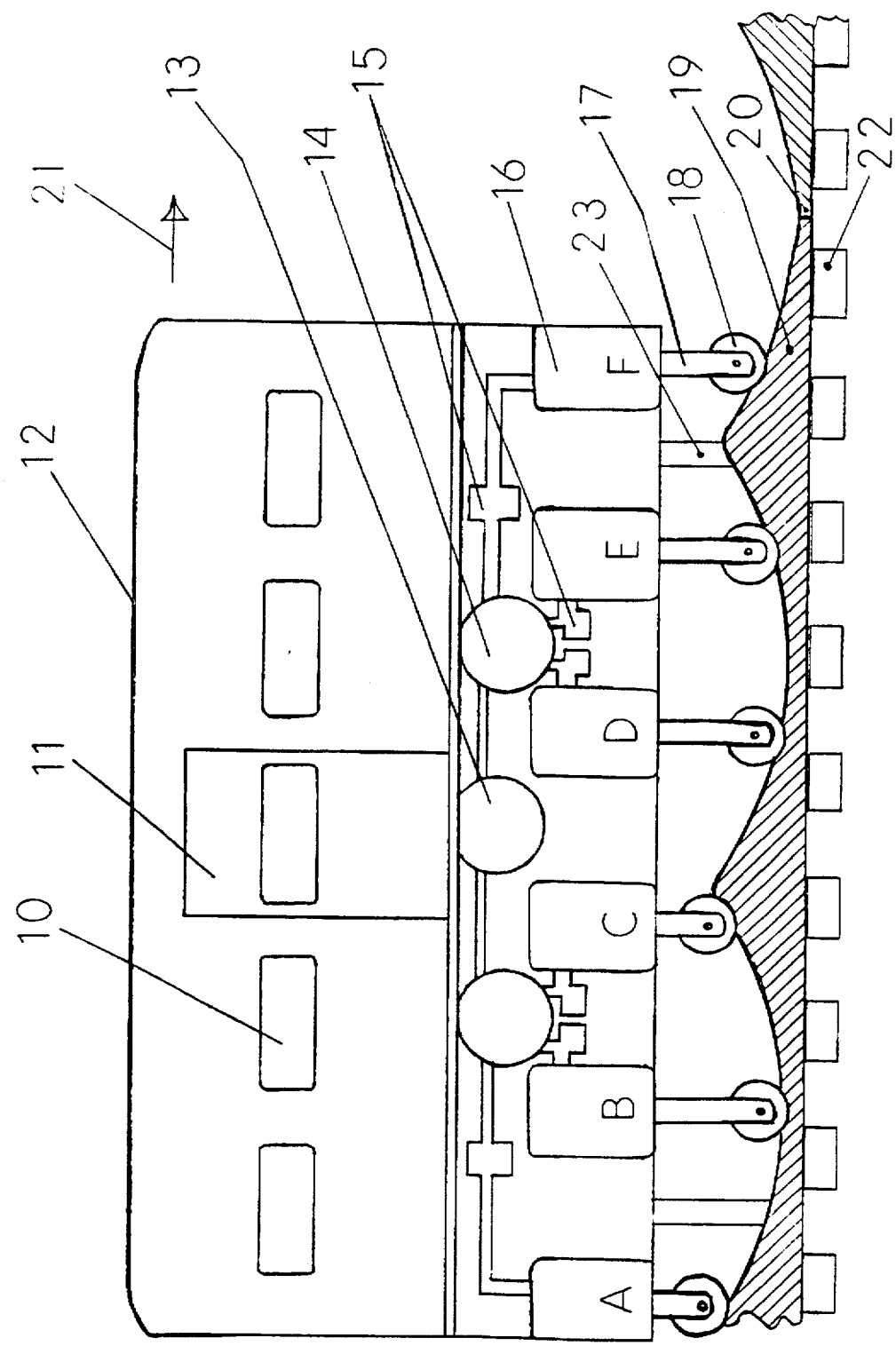
FIG. 1 is a side view of a railroad car on its tracks which embodies the invention's systems.

Referring now to the drawings wherein like reference characters indicate like parts in the several views, there is shown in FIG. 1 the railroad car's side view wherein the passenger compartment 12 with door 11 and passenger windows 10 sits upon an undercarriage that is traveling in the direction of arrow 21. Its undercarriage contains the mechanisms that operate the wheels 18. These several parts are a gas turbine electric generator and air compressor 13. A front air pressure tank 14. There is also a rear air pressure tank evidenced in the figure. Computers 15 are positioned so each of the six computers 15 shown are next to the air cylinder 16 which they individually control. The computers 15 in connection with the air pressure tanks 14 and the air cylinders 16 inherently form a controlling system in the form of an electro-mechanical controller or fluid controller. The piston rod for each cylinder 17 projects downward to secure a wheel on its bottom end using an axle to support its individual wheel 18. The support bracket for the idler wheel 23 secures the train car to the track. The rail 19 displays its characteristic undulations or waves on its top which allow the wheels to first roll downhill and then up hill. The joint between the ends of abutting individual rails 20 is purposely arranged in the layout of the track for the train's right of way to occur at the lowest point in the wave form created by the undulating tracks. Since the oscillating wheels 18 of the car 12 are mechanically restrained from projecting downward from the car 12 far enough to contact that portion of the undulating track 19 the wheels 18 cannot reach down far enough to contact the lowest portion of the track 19, the joint 20 is provided between each abutting rail 19. This mechanical restraint of the wheels 18 keeps them from contacting the track 19 at the portion of the track where the track abutment joints 20 are located in the troughs of the wave formed track segments. The wooden ties 22 are the same as those used currently. The air cylinders and their attached wheels are marked A through F. There are a duplicate set of six air cylinders and wheels (G through L) on the far side of the car making a total of twelve wheels on the car. Of these wheels, only the ones rolling down the face of the wave which faces the direction of travel 21 (Wheels A,D and F in FIG. 1) are expected to support the weight of the car. The wheels rolling up the back face of the wave (B,C and E in FIG. 1) are not supporting any weight of the car since the air in their air cylinders has been vented to the atmosphere. The effect of this arrangement is to always have the car's weight situated totally on the wheels that are rolling downhill while the wheels rolling up hill are free to retract unopposed into their air cylinder to prepare for their next downhill run.

The computer connected individually to each air cylinder monitors constantly the total number of load carrying wheels so it can calculate and effect the entry of the proper amount of air pressure into the cylinder to make that cylinder carry its share of the load at any one moment. The computer also counts the number of waves on the track that it traversed since it left the last station. This allows it to know exactly where it is and how far ahead the next car is on the same track. This system is absolutely accurate and foolproof within a few feet of the actual. With this kind of accurate tracking of the cars the population of cars on the same track can be increased many fold over the density of traffic todays railroads can sustain. That means the same roadbeds now used for train traffic will be able to carry thirty or more times the volume of traffic that they do today at speeds several times higher than today's speeds. The computer also opens the valve as the wheel reaches the bottom of its stroke so all air pressure escapes and lets the wheel retract unopposed up into its air cylinder preparatory to its next downhill roll. The computer communicates with all the eleven other computers to insure its wheel is carrying its proper share of the load and also reacting properly to bank the car around curves in the right of way so the turning forces do not act to throw the passengers to one side of the car or the other as the car negotiates the curve. When the car wants to brake to slow down the computer which receives the signal and has its wheel rolling up the back face of the track's wave will prevent some of the trapped air in the air cylinder which supports its wheel from escaping. This will have the effect of forcing the wheel against the up hill, back face of the wave enough to slow the car in its forward movement. The car cannot lift off the tracks because of the idler wheels attached to the idler wheel supports 23.

FIG. 2 shows these idler wheels 25 in the front view of the railroad car. They are fixed in place to run trapped in a slot which runs parallel to and along the bottom of the inside of the rail. There are at least four of them one of which is situated on each corner of the car. In some applications of this invention, such as on train cars expected to run in very hilly landscapes, there could be a need to apply torque to the wheels to drive them as well as using the force of gravity to move the car forward. This could be done by using a drive shaft on each wheel connected to the wheel's axle by a right angle gear train in conjunction with the rolling with gravity already shown to be the car's main motive force. In this case it would aid the wheel's traction to have a rubber wheel band around the steel wheel 18. This would be one of the options which would be obvious to anyone skilled in railroad design. Item 24 is the standard railroad spike utilized on both sides of the rail which secures the rail to the wooden tie. All other numbered items shown in FIG. 2 are already identified in FIG. 1.

At stations where some cars would want to stop, it would always require some form of switching to exit selected cars which wanted to stop off of the right of way so other cars traveling on without stopping would not be delayed. All the standard track and signaling equipment now in use on the railroads would still be useful in this SKATE TRAIN concept. Only the rails and cars change to embody this invention's concepts.

Figure 3:
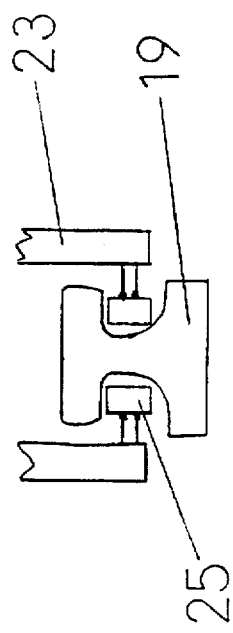
FIG. 3 is an end view of a single track with idler wheels.

FIG. 3 shows an end view of the idler wheel assembly and the rail it runs against wherein the support brackets for the idler wheels 23 holds the idler wheels 25 into position in relationship to the rail 19 so either one or two idler wheels located at each of the four corners of the SKATE TRAIN car can lock the car to its tracks.

Figure 4:
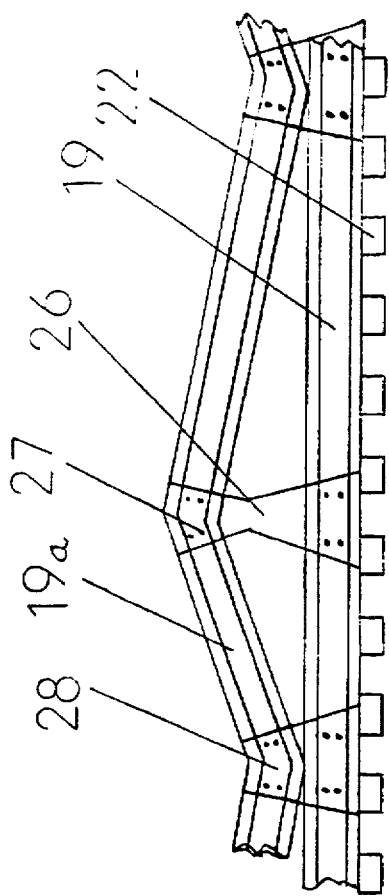
FIG. 4 is a side view of the assembled SKATE TRAIN track.
Figure 5:
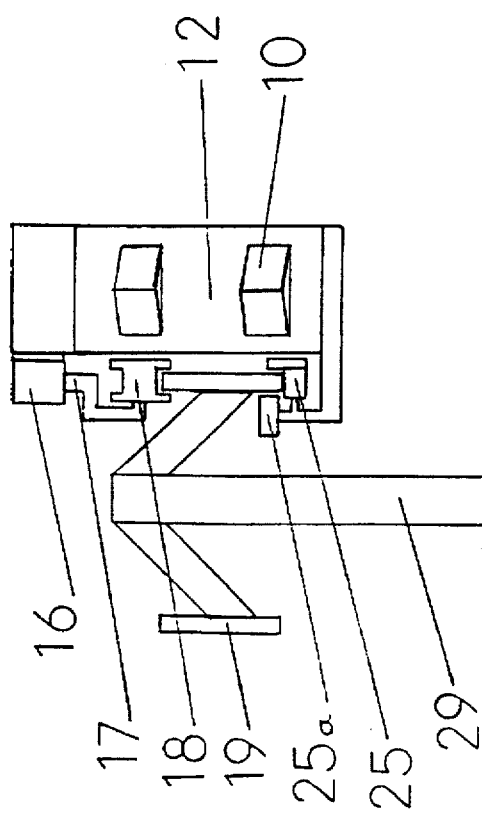
FIG. 5 is an end view of a SKATE TRAIN monorail system.

FIG. 4 shows a side view of a section of SKATE TRAIN rail made from an assembly of parts which form the completed SKATE TRAIN track. Track 19 rests upon ties 22 and carries on its far side the channel in which the idler wheels 25 traverse. In this configuration the idler wheels 25 are located only on the far side of rail 19. On the near side of rail 19 the connector plates 28 and 26 are held to track sections 19 and 19a with mechanical connectors 27 and join track sections 19a and 19 together into a rigid track assembly unit which thereby creates a continuous railroad right of way. It is obvious that rails 19 and 19a can be each constructed of one continuous rail or of many rail segments held together by connector plates 28 and 26. FIG. 5 shows the end view of a SKATE TRAIN car 12 with windows 10 suspended on an elevated monorail track 19 which in turn is assembled in a fixed position to pylon 29. Pylon 29 is secured in a vertical position by its foundation in the earth and exhibits two rails 19 which provide a right of way that will support the operation of two SKATE TRAINS 12 simultaneously going in opposite directions. Idler wheels 25 and 25a lock car 12 to track 19 while wheel 18 runs along the top undulations on track 19. Piston rods 17 connected to cylinders 16 forces wheels 18 up and down in synchronization with the undulations of the top of the rail 19. It is obvious that other types of rail systems such as monorail systems will profit from this concept and experience great reductions in operating costs while increasing car speed and over the right of way traffic densities.

Figure 6:
FIG. 6 is a side view of a one piece SKATE TRAIN track section.

FIG. 6 shows a one piece SKATE TRAIN rail with characteristic undulations on its top surface. SKATE TRAIN rails can be made from one piece of material as in FIG. 6 or fabricated from many pieces as in FIG. 4.

Figure 7:
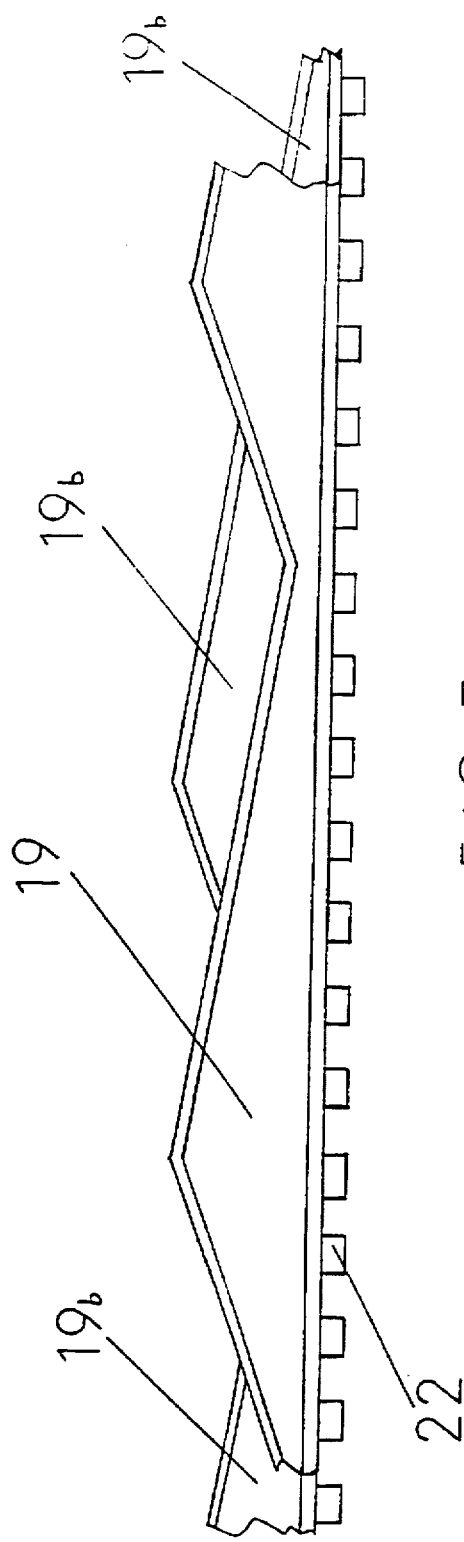
FIG. 7 is a side view of parallel, out of phase SKATE TRAIN rails.

FIG. 7 shows a side view of two SKATE TRAIN rails 19 and 19b mounted on ties 22 which rails are situated parallel to each other but arranged so that their undulations are out of phase with one another. Rail 19 is situated on the near side of rail 19b and exhibits its undulations as occurring in an asynchronous fashion with those undulations of rail 19b. It is obvious that contrary to the FIG. 1 arrangement of the two parallel rails 19 in which they have their wave crests exactly side by side to each other that instead they could have the crest of the waves on one track occur exactly beside the other track's trough in its wave forms. This could serve to further minimize the vibrations from changes in wheel movement.

Figure 8:
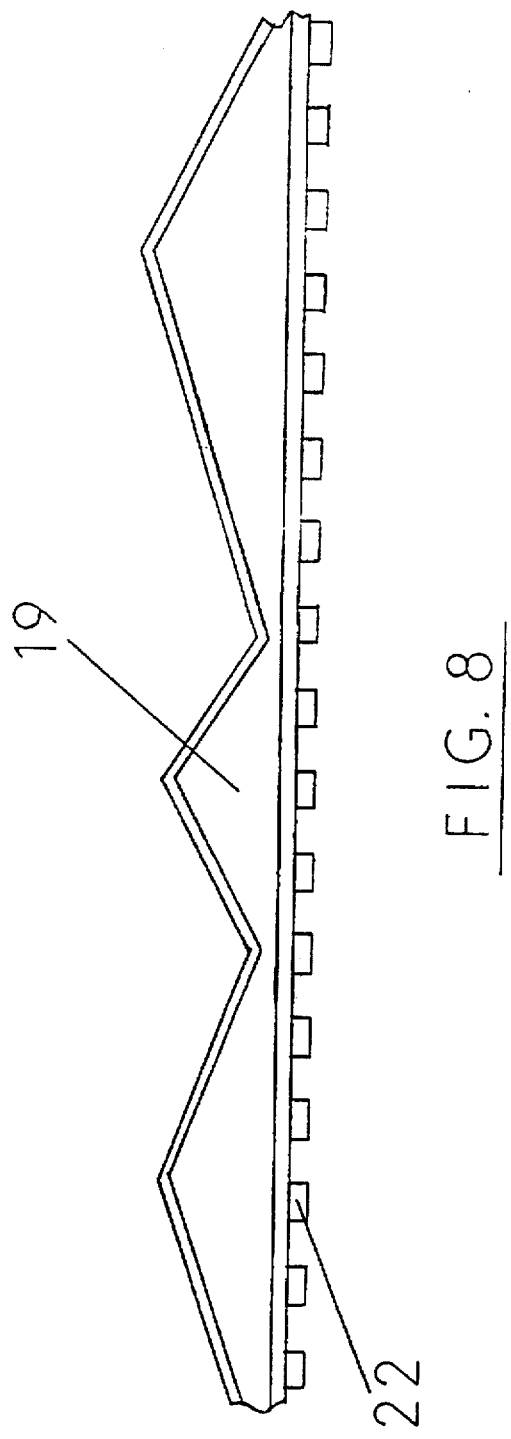
FIG. 8 is a side view of SKATE TRAIN rail in which the frequency of the undulations are shown to change.

FIG. 8 shows a SKATE TRAIN rail 19 mounted on ties 22 which exhibits undulations along its top surface that change in their frequency of length and height of undulation. It is obvious that the spacing between the crests of the waves formed on the top of the track can be closer together than shown or farther apart. There are many reasons for this including for example the increased acceleration a closer spacing of the wave crests could effect. Over long, flat expanses of right of way a longer space between wave crests could be adequate to maintain the car's speed without needing quite so much up and down action of the wheels that closer wave crests would demand. Obviously, undulation frequencies between rails laid side by side and parallel could also be different.

FIG. 9 shows a side view describing yet another mechanical means of presenting the multitude of the invented railroad car's wheels to the invented undulating track's top surface. Four or more large wheels 36 are mounted one to each of the corners of the undercarriage of the rail car and used to propel the rail car down the undulating tracks. Wheel 36 is powered and turns on bearings rotating about axle 35. Brake 34 is used to help control the rotational velocity of wheel 36. Smaller wheels 33 are mounted around the circumference of wheel 36 and are activated to move towards or away from axle 35 as needed while the train car is in motion using air cylinders 30 to extend or retract piston rods 37 which in turn are connected to and move axles 31 in and out along the radius of wheel 36. Brake 32 controls the rotational velocity of wheel 33 on each wheel shown. Wheel 33 is supported on its own individual axle that is connected to piston rod 37. Although eight wheels 33 are shown, there could be differing numbers of wheels 33 attached to large wheel 36 as needed for different applications. This type of wheel design could also find application on land or amphibious vehicles that travel using pneumatic rubber tires without the use of a track. Although air cylinders 30 and piston rods 37 are shown to be the mechanism which extends and retracts wheels 33 along a line of travel parallel with the radius of wheel 36, any other method or mechanism such as cams or gear drives or hydraulic cylinders or rack and pinion gear drives or a linear electric motor or any other such activating mechanisms could be used in the place of these air cylinders 30 and piston rods 37 to activate wheels 33 as described.

FIG. 10 shows a side view of a section of the invented undulating track with its top surface displaying a curvilinear shape rather than a liner shape as shown in previous figures. This shape would find one potential application with the wheel described in FIG. 9. It would allow for that wheel 36 to adjust the positions of its peripheral wheels 33 so that at any given speed they would fit the undulations of the track 19c in a way that would allow wheels 33 to remain in a fixed position without any further adjustment in or out by piston rods 37 and air cylinders 30 until a change in speed was effected. At that time a change in the position of wheels 33 might be needed and they would be so set in their projection away from the center point of wheel 36 to again effect the proper rhythm with the undulating track 19c.

It is obvious that the embodiments of this invention could be successfully effected using many different types of materials other than those described in this patent and even different from those normally used currently by the railroads for the parts described in these FIGURES. I do not intend to limit these designs to only steel parts or some other metal.

The wheels, for example, could be just like automobile tires and the rails made from cast, reinforced concrete for example.

It is also obvious that other forms of power plants could be used to generate the air pressure and electricity needed to run this car such as piston engines rather than a gas turbine.

It is also obvious to one skilled in design that this railroad car could utilize a system of cam followers and cam shafts to move its wheels up and down rather than the air cylinders I have shown. Another obvious method of implementing cams would be to have sliding bars with cam surfaces oscillating back and forth to impinge on the top end of the vertical wheel shafts in place of the air cylinders to move the wheels up and down. It is obvious that there are many different mechanical methods to control the up and down motion of the wheels once one sees the invention's method for propelling a railroad car by using such a novel method.

I claim:

1. A high speed wheel, comprising:
   a) a first wheel having a first diameter and an axle for rotation thereon;
   b) a brake to control the rotational velocity of said first wheel;
   c) a plurality of secondary wheels each of said secondary wheels having a brake and having second diameters smaller than said first diameter, and mounted on said first wheel so that a portion of the circumference of each of said secondary wheels projects beyond the circumference of said first wheel; and
   d) means operatively connected to said first wheel and to each of said plurality of secondary wheels for extending and retracting said secondary wheels relative to said axle of said first wheel.

2. The wheel assembly of claim 1 wherein said means comprises a plurality of air cylinders.

3. The wheel assembly of claim 1 wherein said means comprises a plurality of pistons.

* * * * *